June 9, 1959

C. VAN DER LELY ET AL 2,889,678

RAKING DEVICE COMPRISING A FRAME WHICH IS PROVIDED
WITH RUNNING WHEELS AND A HANDLE

Filed July 6, 1956

United States Patent Office 2,889,678
Patented June 9, 1959

2,889,678

RAKING DEVICE COMPRISING A FRAME WHICH IS PROVIDED WITH RUNNING WHEELS AND A HANDLE

Cornelis van der Lely and Ary van der Lely, Maasland, Netherlands, assignors to Cornelis van der Lely, Maasland, Netherlands Application July 6, 1956, Serial No. 596,271

Claims priority, application Netherlands July 26, 1955

13 Claims. (Cl. 56—377)

The present invention relates to a device for laterally displacing material lying on the ground, said displacement being effected by means of a number of rake wheels, which device comprises a frame which is supported by one or more rake wheels.

Devices of this kind are generally known and during operation they are drawn by a draught-animal or a tractor.

It is an object of the present invention to provide a very simple and cheap device of the kind mentioned, which is especially useful in agricultural undertakings where only a small surface of grass needs be mown and cleaned and usually the grass is hand-raked on heaps. According to the present invention the frame of the device is provided with a handle over which a force required for the travelling movement is exerted by a person. Since such machine can be very small and owing to that very cheap and has a much smaller power consumption than a normal man-handled rake provided with a shank, according to the invention the device can yield economical profit even while being used infrequently.

Other and further objects and advantages of the present invention will become apparent from the following description and the drawing relating thereto, in which a preferred embodiment of the device according to the invention has been illustrated by way of example and in which.

Figure 1:
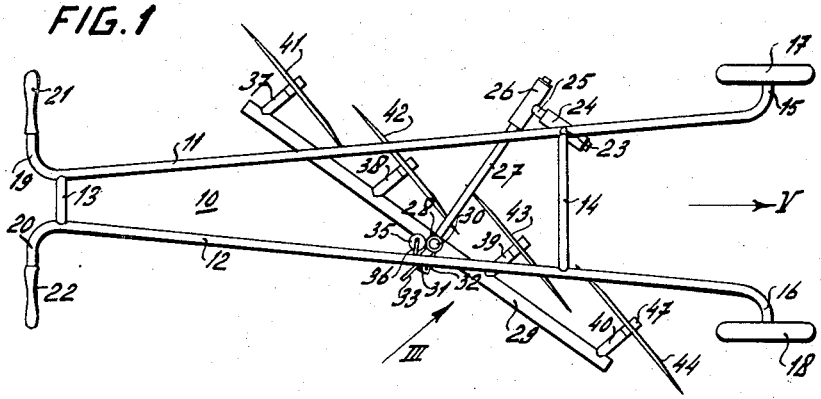
Fig. 1 represents a plan view of the applicants' device.
Figure 2:
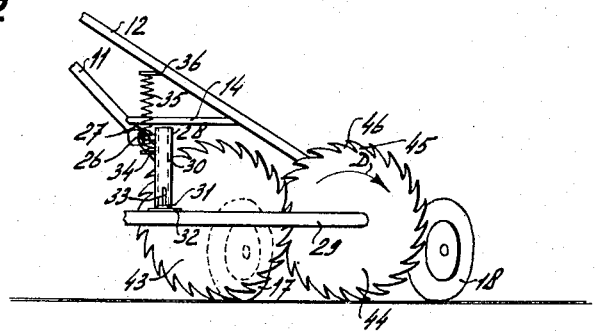
Fig. 2 shows a side elevation of a part of said device viewed in the direction of the arrow II in Fig. 1.

The rake shown in Figs. 1 and 2 comprises a frame 10 consisting of two long tubes 11 and 12 which are interconnected by means of two short tubes 13 and 14. The foreparts 15 and 16 of the tubes 11 and 12 are bent to the outside so that they are in alignment and form axles for two running wheels 17 and 18. The rear ends 19 and 20 of the tubes 11 and 12 are also bent to the outside and carry handles 21 and 22 which can be located during operation at a height of about 1.1 yards above the ground, so that they can serve easily for causing the frame 10 to be pushed forward by a person. A tube 24 which is horizontal in the normal working position of the frame 10 is fixedly mounted to the tube 11 at the point of connection 23 of the tubes 11 and 14. An axle 25 is rotatable supported in said tube 24. The axle 25 is rigidly attached to a tube 26 which is horizontal during normal operation and which is perpendicular to the axle 25. A bar 27 is rotatably supported in the tube 26. Said bar 27 is rotatably supported in the tube 26. Said bar 27 makes an angle of about 50° with the normal travelling direction V of the device. The rear end of the bar 27 comprises a tube 28 which is substantially vertical during operation and in which a pin 30 which is rigidly and perpendicularly mounted on a beam 29 is rotatably supported. The lower end of the tube 28 has a perforated segment 31 and the lower end of the pin 30 has a perforated segment 32 located below the segment 31. A locking pin 33 can be put through the segments 31 and 32 for securing the beam 29 in the position shown in Fig. 2 or in any position of a small number of adjacent positions with regard to the bar 27. At 34 the tube 28 is connected to the lower end of a draw spring 35, the upper end of which is connected to the tube 12 at 36.

Further the beam 29 carries four short, mutually parallel axles 37, 38, 39 and 40 extending forward on which rake wheels 41, 42, 43 and 44 are mounted so as to be freely rotatable. When the device travels in the direction V each rake wheel moves partly sliding and partly rolling over the ground, during which the rolling movement causes the wheels to rotate in the direction which for the rake wheel 44 is designated with an arrow D (see Fig. 2). The rake wheel 44 is provided with circumferential tines, like 45 and 46, extending rearwards with regard to the direction of rotation and all of them are formed from one single plastic disc mounted on a hub 47. The rake wheels 41, 42 and 43 have the same construction as the rake wheel 44 and their tines extend also rearwards with regard to the direction of rotation. Owing to this, during forward motion of the rake over a strip of mown grass-land, the grass falls easily down at the rear side of each rake wheel where the wheel turns upwards. The mown grass met during said forward motion by the rake wheel 44 is pushed forward obliquely to the left and forward in the direction of the axle 40 till it will come to lie in front of the rake wheel 43 while moving past the rear edge of said rake wheel 44. After that it is led, conjointly with other grass met by the wheel 43, in the same way to the rake wheel 42 and finally to the wheel 41, after which the grass will lie at the left side of said wheel in the shape of a swath.

The rake wheels 41—44 rest on the ground with a pressure which can be rather small as a result of the working of the spring 35 and the rotatability of the axle 25 in the tube 24. In consequence of the rotatability of the bar 27 in the tube 26 the pressure of the wheels 41—44 on the ground never can be distributed over the wheel in an unfavourable manner and within certain limits the wheels can adapt to slight unevennesses in the surface of the grass-land independently of the position of the frame 10.

As previously stated, the beam 29 can be secured as shown in Figure 2 or in several adjacent positions with regard to the bar 27. Where the cut grass which is to be displaced is small and the clippings are not overly short, it is preferable to secure the beam 29 for a relatively greater angle with direction of travel V, whereby a broader strip can be worked. On the other hand where the clippings are short or where the amount of grass to be displaced is great, the beam 29 should be secured so that a minimum working width is obtained.

What we claim is:

1. A hand operated lawn rake comprising an upwardly and rearwardly inclined mobile frame, a substantially horizontal rake beam having rake wheels arranged in echelon thereon, said beam being arranged at an acute angle to the fore and aft axis of said mobile frame, and a laterally extending bar interconnecting said beam and an intermediate point on said mobile frame.

2. A lawn rake as claimed in 1 wherein there is a handle connected to the upper end or portion of said mobile frame.

3. A lawn rake as claimed in 1 having at least one supporting wheel connected to said mobile frame.

4. A lawn rake as claimed in 3, wherein said running wheel is attached to said mobile frame at its forward lower end.

5. A lawn rake as claimed in 1 wherein said laterally extending bar is hingedly connected to said mobile frame.

6. A lawn rake as claimed in 1 wherein said rake wheels are freely rotatable.

7. A lawn rake as claimed in 6 wherein said rake wheels each have a plurality of tines extending from their circumference.

8. A hand operated lawn rake comprising an upwardly and rearwardly inclined mobile frame, a plurality of rake wheels disposed in an echelon and arranged under said mobile frame at an acute angle to the fore and aft axis thereof, each of said rake wheels having axles, beam means interconnecting said axles, and bar means extending laterally from an intermediate point on said mobile frame, said bar means interconnecting said beam means and said mobile frame.

9. A lawn rake comprising a mobile frame inclined upwardly and rearwardly, handles attached to the upward and rearward end of said mobile frame, wheels connected to the forward and lower part of said mobile frame, a substantially horizontal rake beam having a plurality of rotatable rake wheels arranged in echelon thereon, said beam being at an acute angle to the fore and aft axis of said mobile frame, and a bar hingedly connected to said mobile frame at an intermediate point and extending laterally therefrom, said beam being movably connected to said bar.

10. A lawn rake according to 9 wherein resilient means connects said mobile frame and said beam.

11. A lawn rake according to 9 having adjustment means providing for adjustment of the acute angle between said beam and the fore and aft axis of said mobile frame.

12. A lawn rake as claimed in 3 where in said running wheel is attached to said mobile frame at a point lower than said intermediate point.

13. A hand-operated lawn rake comprising an upwardly and rearwardly inclined mobile frame, at least one handle attached to the upward and rearward end of said mobile frame, a substantially horizontal rake beam having rake wheels arranged in echelon thereon, said beam being arranged at an acute angle to the fore and aft axis of said mobile frame, at least one running wheel connected to said frame at substantially the end of said frame opposite said handle, and a laterally extending bar interconnecting said beam and a point on said mobile frame between said handle and said running wheel.

References Cited in the file of this patent

UNITED STATES PATENTS

| | | |
|---|---|---|
| 1,173,485 | Coldwell | Feb. 29, 1916 |
| 2,472,260 | Morrill | June 7, 1949 |
| 2,680,343 | Enos | June 8, 1954 |
| 2,710,519 | Winter | June 14, 1955 |
| 2,712,212 | Sears | July 5, 1955 |
| 2,735,256 | West | Feb. 21, 1956 |

FOREIGN PATENTS

| | | |
|---|---|---|
| 17,636 | Great Britain | 1900 |